Patented Oct. 3, 1939

2,174,673

UNITED STATES PATENT OFFICE 2,174,673

DISPERSIONS

Herbert A. Winkelmann, Chicago, Ill., assignor to Marbon Corporation, Chicago, Ill., a corporation of Delaware No Drawing. Application September 28, 1936, Serial No. 102,890

5 Claims. (Cl. 260—111)

This invention relates to an improvement in or modification of the process which I have described in my copending application Ser. No. 20,894, filed May 10, 1935, of which the present application is a continuation in part.

In that application Ser. No. 20,894, I have described the milling into rubber of various materials, the reaction of the composition with hydrogen chloride, and the dispersing of the composition in solvents.

The dispersion of crystalline substantially saturated rubber hydrochloride in solvents is no easy matter. This is particularly true of those crystalline rubber hydrochlorides made by reacting solid rubber with gaseous hydrogen chloride at elevated temperatures.

I have found that certain materials, some of which are disclosed in my copending application, will greatly increase the ease of dispersion of these crystalline rubber hydrochlorides in solvents such as benzol, toluol, xylol, ethylene dichloride and the like.

In general, materials which will themselves readily dissolve in solvents such as the above are suitable provided that they either do not react with hydrogen chloride or react to form products which are also readily soluble. The materials are milled into the rubber, and the composition reacted with gaseous hydrogen chloride under superatmospheric pressure. The resulting composition is an intimate mixture of substantially saturated rubber hydrochloride and the added ingredient. This intimate mixture will dissolve in mutual hot solvents with an ease far out of proportion to what might be expected.

For example:—thin sheet rubber of .02" thickness containing no additional ingredient reacts with gaseous hydrogen chloride at 300 lbs. pressure at about 100° C. to give a substantially saturated rubber hydrochloride which on extraction with boiling benzol for one hour leaves about 20% of unextracted matter. Thin sheet rubber of .02" thickness containing 20% of glyceryl abietate ester gum reacted under the same conditions and extracted in the same manner leaves substantially no residue.

Other materials which when milled into rubber and reacted with gaseous hydrogen chloride will give similar results to glyceryl abietate are glyceryl maleates and other ester gums, rosin, opal wax, petroleum oils, naphthalene, paraffin wax, paraffin oils, stearic acid, pine tar, coconut oil, ester gum, modified alkyds, chlorinated diphenyls, chlorinated paraffin, chlorinated naphthalene, polycumarone and polyindenes. I prefer to use compatible resin gums such as rosin and glyceryl abietate.

My invention is particularly applicable to making films from substantially saturated crystalline rubber hydrochlorides, particularly the crystalline rubber hydrochloride made by reacting solid sheet rubber with gaseous hydrogen chloride. These films are characterized by their high softening point, a property which makes them of value for laminating purposes, where the composite product may be used at above room temperatures. The films are also highly resistant to cold solvents, water, gasoline and turpentine.

The following example will illustrated my invention:

Glyceryl abietate ester gum, 20 parts by weight, is milled into 100 parts of uncured rubber and the composition sheeted into sheets of about .02" thickness. The sheets are reacted with gaseous hydrogen chloride at 300 lbs. per sq. in. pressure at 100° C. until the rubber is substantially saturated with hydrogen chloride. The resulting mass is then an intimate mixture of crystalline rubber hydrochloride and glyceryl abietate. An 8% solution of this composition is then prepared by agitating it in boiling ethylene dichloride. A film is cast and dried at 70° C. for one-half hour.

The films were highly resistant to water, alcohol, gasoline and turpentine, and only slightly softened by cold benzol and ethylene dichloride. The softening point of the films was markedly higher than that of amorphous rubber hydrochloride.

It is to be understood that the above example is merely illustrative and not restrictive since the ingredients and proportions may be varied without departing from the spirit of my invention. While I prefer that the resin or other relatively soluble material be present in minor proportions compared to the rubber hydrochloride, this is not essential. Moreover, the method of incorporating the relatively soluble material with the rubber hydrochloride may vary. However, I have found that the milling and fluxing of the rubber with the relatively soluble material gives superior results, particularly when the relatively soluble material is a resin gum.

I claim:

1. The improvement in the method of making dispersions of rubber hydrochloride in benzol, toluene, xylol, ethylene dichloride and the like, which comprises fluxing rubber with a resin which is soluble in one of said solvents, until an intimate mixture of rubber and resin is obtained, calendering the mixture into thin sheets, reacting said sheets with hydrogen chloride in the absence of solvents for the resin and the rubber, whereby there is obtained an intimate mixture of rubber hydrochloride and resin, and agitating the mixture of rubber hydrochloride and resin in a solvent for the resin selected from the class of benzol, its homologs, and ethylene dichloride.

2. The improvement in the method of making dispersions of rubber hydrochloride in benzol, toluene, xylol, ethylene dichloride and the like, which comprises milling rubber with a relatively non-volatile substance which is soluble in one of said solvents and selected from the group consisting of rosin, ester gums, chlorinated diphenyls, polycumarones, polyindenes, alkyd resins, paraffin wax, petroleum oils, naphthalene, stearic acid, pine tar, and cocoanut oil until an intimate mixture of rubber and the soluble substance is obtained, calendering the mixture into thin sheets, reacting said sheets with hydrogen chloride in the absence of solvents for said soluble substance and the rubber whereby there is obtained an intimate mixture of the rubber hydrochloride and said soluble substance, and agitating the mixture of rubber hydrochloride and said soluble substance in a solvent for said substance selected from the class of benzol, its homologs, and ethylene dichloride.

3. The improvement in the method of making dispersions of rubber hydrochloride in benzol, toluene, xylol, ethylene dichloride and the like, which comprises fluxing rubber with an ester gum which is soluble in one of said solvents until an intimate mixture of rubber and ester gum is obtained, calendering the mixture into thin sheets, reacting said sheets with hydrogen chloride in the absence of solvents for the ester gum and the rubber whereby there is obtained an intimate mixture of rubber hydrochloride and ester gum, and agitating the mixture of rubber hydrochloride and ester gum in a solvent for the ester gum selected from the class of benzol, its homologs, and ethylene dichloride.

4. The improvement in the method of making dispersion of rubber hydrochloride in benzol, toluene, xylol, ethylene dichloride and the like, which comprises fluxing rubber with rosin until an intimate mixture of rubber and rosin is obtained, calendering the mixture into thin sheets, reacting said sheets with hydrogen chloride in the absence of solvents for the rosin and the rubber whereby there is obtained an intimate mixture of rubber hydrochloride and rosin, and agitating the mixture of rubber hydrochloride and rosin in a solvent for the rosin selected from the class of benzol, its homologs, and ethylene dichloride.

5. The improvement in the method of making dispersions of rubber hydrochloride in benzol, toluene, xylol, ethylene dichloride and the like, which comprises fluxing rubber with a cumarone resin until an intimate mixture of rubber and cumarone resin is obtained, calendering the mixture into thin sheets, reacting said sheets with hydrogen chloride in the absence of solvents for the cumarone resin and the rubber whereby there is obtained an intimate mixture of rubber hydrochloride and cumarone resin, and agitating the mixture of rubber hydrochloride and cumarone resin in a solvent for the cumarone resin selected from the class of benzol, its homologs, and ethylene dichloride.

HERBERT A. WINKELMANN.